(12) United States Patent
Ikeda et al.

(10) Patent No.: US 10,747,333 B2
(45) Date of Patent: Aug. 18, 2020

(54) COVER

(71) Applicant: NINTENDO CO., LTD., Kyoto (JP)

(72) Inventors: Kenichi Ikeda, Kyoto (JP); Kazuhiro Maruyama, Kyoto (JP); Kochi Kawai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/923,291

(22) Filed: Mar. 16, 2018

(65) Prior Publication Data

US 2018/0275769 A1 Sep. 27, 2018

(30) Foreign Application Priority Data

Mar. 22, 2017 (JP) ................. 2017-055932

(51) Int. Cl.
*G06F 3/02* (2006.01)
*G06F 3/044* (2006.01)
*H04M 1/02* (2006.01)
*G06F 1/16* (2006.01)
*H04M 1/18* (2006.01)
(Continued)

(52) U.S. Cl.
CPC .......... *G06F 3/0219* (2013.01); *G06F 1/1626* (2013.01); *G06F 1/1643* (2013.01); *G06F 3/02* (2013.01); *G06F 3/039* (2013.01); *G06F 3/044* (2013.01); *H04M 1/185* (2013.01);
(Continued)

(58) Field of Classification Search
CPC ........ G06F 1/1626; G06F 1/1643; G06F 3/02; G06F 3/0219; G06F 3/039; G06F 3/044; G06F 2200/1633; H04M 1/0202; H04M 1/185; H04M 1/23
See application file for complete search history.

(56) References Cited

U.S. PATENT DOCUMENTS 8,503,170 B1 * 8/2013 Hsu ...................... G06F 1/1626
    206/320
2006/0256090 A1 * 11/2006 Huppi ................. A63F 13/2145
    345/173

(Continued)

FOREIGN PATENT DOCUMENTS

JP 2015-192311 11/2015

*Primary Examiner* — Mihir K Rayan
(74) *Attorney, Agent, or Firm* — Xsensus LLP

(57) ABSTRACT

A non-limiting example cover includes a first cover portion that is provided with a plurality of operation buttons. Each of key tops of the plurality of operation buttons is constituted by a key top portion, an actuator and a conductive member. A connection portion of a conductive sheet is provided between the key top portion and the actuator, and the connection portion is connected, via a coupling portion, to a body portion that is provided on an outside of an area arranged with the key tops. The connection portion is connected to a protrusion provided on a lower side of the key top. Resin plating is applied to the protrusion, and when the key top is depressed and thus a portion of the key top portion where the protrusion is provided is brought into contact to the conductive member, the conductive member and the conductive sheet are electrically connected to each other via the resin plating. Therefore, an electrostatic capacitance of a touch panel changes at a portion that the conductive member is in contact, whereby it can be detected that the touch panel is touched at the portion concerned.

23 Claims, 12 Drawing Sheets

(51) Int. Cl.
    *G06F 3/039*     (2013.01)
    *H04M 1/23*     (2006.01)

(52) U.S. Cl.
    CPC ... *G06F 2200/1633* (2013.01); *H04M 1/0202* (2013.01); *H04M 1/23* (2013.01)

(56) References Cited

U.S. PATENT DOCUMENTS

| | | | |
|---|---|---|---|
| 2008/0074329 A1* | 3/2008 | Caballero | H01Q 1/088 343/702 |
| 2010/0302168 A1* | 12/2010 | Giancarlo | G06F 1/1662 345/169 |
| 2011/0157037 A1* | 6/2011 | Shamir | G06F 1/1626 345/173 |
| 2011/0157056 A1* | 6/2011 | Karpfinger | G06F 3/0488 345/173 |
| 2011/0297525 A1* | 12/2011 | Tsai | H01H 13/86 200/517 |
| 2014/0232950 A1* | 8/2014 | Park | G06F 3/044 349/12 |
| 2015/0261297 A1* | 9/2015 | Quek | G06F 3/044 345/174 |
| 2015/0301655 A1* | 10/2015 | Liu | G06F 1/1613 345/174 |
| 2017/0012658 A1 | 1/2017 | Otsubo et al. | |
| 2020/0073484 A1* | 3/2020 | Garelli | G06F 1/1616 |

* cited by examiner

NON-OPERATED STATE

OPERATED STATE

COVER

CROSS REFERENCE OF RELATED APPLICATION

The disclosure of Japanese patent application No. 2017-55932 filed on Mar. 22, 2017 is incorporated by reference.

FIELD

This application describes a cover that is removably attachable to electronic equipment having a touch screen equipped with a touch panel of an electrostatic capacitance system and a display.

SUMMARY

It is a primary object of an embodiment(s) to provide a novel cover.

Moreover, it is another object of the embodiment(s) to provide a cover capable of easily operating a touch screen of electronic equipment even in a state where the cover is attached.

A first embodiment is a cover that is removably attachable to electronic equipment having a touch screen equipped with a touch panel of an electrostatic capacitance system and a display, comprising: a key top; a first conductive portion; a second conductive portion; and a returning portion. The key top is operable by a user. The first conductive portion is contactable to the touch screen. The second conductive portion is electrically connected to the first conductive portion in response to the operation of the key top so as to make the touch panel react. The returning portion returns the key top to a state where the key top is not operated after the key top is operated.

According to the first embodiment, since the second conductive portion is electrically connected to the first conductive portion in response to an operation of the key top, and the first conductive portion performs power distribution in order to make the touch panel react, it is possible to easily operate the touch panel even in a state of attaching the cover to the electronic equipment.

Moreover, according to the first embodiment, it is possible to make the touch panel react only by operating the key top, so that the user does not need to operate an operation button with a bare hand. For example, even while wearing a non-conductive glove, it is possible to make the touch panel react by operating the operation button.

Furthermore, according to the first embodiment, since the operation button is provided on the cover, by operating the same operation button, it is possible to make the same portion of the touch panel react. Therefore, if a predetermined operation input is set to the portion of the touch panel corresponding to that operation button, a desired operation input can be reliably performed.

A second embodiment is the cover according to the first embodiment, wherein at least a part of the first conductive portion is arranged between the key top and the touch screen.

According to the second embodiment, it is possible to bring the first conductive member into contact to the touch screen by operating the key top toward a side of the touch screen.

A third embodiment is the cover according to the first embodiment, wherein at least a part of the second conductive portion is provided outside the key top and inside the cover.

According to the third embodiment, the second conductive portion can be formed up to an outside of an area provided with the key top as long as within the cover. Therefore, since an area of the second conductive portion can be enlarged comparatively, it is possible to increase an electrostatic capacitance formed by the second conductive portion. Therefore, it is possible to make the touch panel react reliably in response to the operation of the key top.

A fourth embodiment is the cover according to the first embodiment, wherein the second conductive portion includes at least a connection portion configured to electrically connect to the first conductive portion.

A fifth embodiment is the cover according to the first embodiment, wherein the second conductive portion is in a form of thin film at least a part of the second conductive portion.

According to the fifth embodiment, since at least a part of the second conductive portion is in a form of thin film, even if this part is arranged between the key top and the touch screen, it is possible to miniaturize structure of the cover more.

A sixth embodiment is the cover according to the first embodiment, wherein a part of the second conductive portion is configured to contact to a housing of the electronic equipment.

According to the sixth embodiment, when the housing of the electronic equipment has conductivity, it is possible to make the touch panel react more reliably.

A seventh embodiment is the cover according to the first embodiment, wherein the first conductive portion is provided in a plural number.

According to the seventh embodiment, a plurality of key tops can be provided respectively corresponding to the plurality of first conductive portions.

An eighth embodiment is the cover according to the seventh embodiment, wherein the second conductive portion is configured to be electrically connected to the plurality of first conductive portions.

According to the eighth embodiment, it is possible to make the touch panel react in response to an operation of each of the key tops provided respectively corresponding to each of the plurality of first conductive portions. Therefore, an operation input according to each key top is possible.

A ninth embodiment is the cover according to the seventh embodiment, wherein the second conductive portion includes a plurality of connection portions. Each of the plurality of connection portions is configured to electrically connected to corresponding one of the first conductive portions. That is, the plurality of connection portions of the second conductive portion are connected to the plurality of first conductive portions one by one.

According to the ninth embodiment, it is possible to perform an operation input according to each key top, like the eighth embodiment.

A tenth embodiment is the cover according to the first embodiment, wherein the key top is a direction input portion configured to input a direction. For example, the first conductive portion is provided corresponding to each direction of the direction input portion (key top).

According to the tenth embodiment, even if the key top is formed in a plural number, it is possible to make the touch panel react in response to an operation of each of the plurality of key tops.

An eleventh embodiment is the cover according to the first embodiment, wherein the key top is provided with a protruding portion, and the second conductive portion is formed with a first hole configured to be engaged with the protruding portion.

According to the eleventh embodiment, since the protruding portion provided on the key top is made to be engaged with the first hole of the second conductive portion, it is possible to prevent the second conductive portion from breaking away.

A twelfth embodiment is the cover according to the first embodiment, wherein the key top is provided with a protruding portion, and the returning portion is formed with a second hole configured to be engaged with the protruding portion.

According to the twelfth embodiment, since the protruding portion provided on the key top is engaged with the second hole of the returning portion, it is possible to prevent the returning portion from breaking away. Moreover, if the second conductive portion is arranged between the key top and the returning portion, it is possible to prevent the second conductive portion from breaking away more reliably.

A thirteenth embodiment is the cover according to the first embodiment, wherein the cover includes a first cover portion that covers at least a part of the touch screen on a surface of the electronic equipment and a second cover portion that covers at least a part of a surface of the electronic equipment opposite to the surface provided with the touch screen.

A fourteenth embodiment is the cover according to the thirteenth embodiment, wherein the key top is provided on the first cover portion.

A fifteenth embodiment is the cover according to the thirteenth embodiment, wherein the first cover portion is formed with an opening or cutout configured to make at least a part of the touch screen be visually recognized.

According to the fifteenth embodiment, it is possible to perform an operation while looking at the touch screen.

A sixteenth embodiment is the cover according to the fifteenth embodiment, the first cover portion is provided with a transmissive portion that transmissively covers the opening or cutout.

A seventeenth embodiment is the cover according to the first embodiment, wherein at least a part of the key top to be touched by a user when being operated is non-conductive.

An eighteenth embodiment is a cover that is removably attachable to electronic equipment having a touch screen equipped with a touch panel of an electrostatic capacitance system and a display, comprising: a key top; a first conductive portion; and a second conductive portion. The key top is operable by a user. The first conductive portion is contactable to the touch screen. The second conductive portion is electrically connected to the first conductive portion in response to the operation of the key top so as to make the touch panel react. At least a part of the key top to be touched by the user when being operated is non-conductive.

According to the eighteenth embodiment, like the first embodiment, it is possible to easily operate the touch panel even in a state of attaching the cover to the electronic equipment. Moreover, even while wearing a non-conductive glove, it is possible to make the touch panel react by operating an operation button. Furthermore, it is possible to perform a desired operation input reliably.

A nineteenth embodiment is a cover that is removably attachable to electronic equipment having a touch screen equipped with a touch panel of an electrostatic capacitance system and a display, comprising: a key top; a first conductive portion; and a second conductive portion. The key top is operable by a user. The first conductive portion is contactable to the touch screen, and configured to be electrically connected in order to make the touch panel react in response to an operation of the key top. The second conductive portion is electrically connected to the first conductive portion in response to the operation of the key top. Moreover, the second conductive portion is provided outside the key top and inside the cover.

According to the nineteenth embodiment, like the first embodiment, it is possible to easily operate the touch panel even in a state of attaching the cover to the electronic equipment. Moreover, even while wearing a non-conductive glove, it is possible to make the touch panel react by operating an operation button. Furthermore, a desired operation input can be reliably performed.

A twentieth embodiment is the cover according to the nineteenth embodiment, wherein at least a part of the key top to be touched by the user when being operated is non-conductive.

The twenty-first embodiment is a cover that is removably attachable to electronic equipment having a touch screen equipped with a touch panel of an electrostatic capacitance system and a display, comprising: a first cover portion that covers at least a part of the touch screen; and a second cover portion that covers a surface of the electronic equipment opposite to a surface provided with the touch screen. The first cover portion is formed with an opening or cutout configured to make at least a part of the touch screen be visually recognized, and is provided with a key top that is operable by a user and a conductor configured to contact to the touch panel and is connected in order to make the touch panel react in response to an operation of the key top, wherein at least a part of the key top to be touched by the user when being operated is non-conductive.

According to the twenty-first embodiment, like the first embodiment, it is possible to easily operate the touch panel even in a state of attaching the cover to the electronic equipment. Moreover, even while wearing a non-conductive glove, it is possible to make the touch panel react by operating the operation button. Furthermore, it is possible to reliably perform a desired operation input.

The twenty-second embodiment is a cover that is removably attachable to electronic equipment having a touch screen equipped with a touch panel of an electrostatic capacitance system and a display, comprising: a first cover portion that covers at least a part of the touch screen; and a second cover portion that covers a surface of the electronic equipment opposite to a surface provided with the touch screen. The first cover portion is formed with an opening or cutout configured to make at least a part of the touch screen be visually recognized, and is provided with a key top that is operable by a user and a conductor configured to contact to the touch panel and is connected in order to make the touch panel react in response to an operation of the key top. The key top includes a first portion that is touched when being operated by the user, a second portion that is contactable to the conductor and a third portion that connects the first portion and the second portion to each other, the third portion having conductivity.

According to the twenty-second embodiment, like the first embodiment, it is possible to easily operate the touch panel even in a state of attaching the cover to the electronic equipment. Moreover, it is possible to reliably perform a desired operation input.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

First Embodiment

Figure 1:
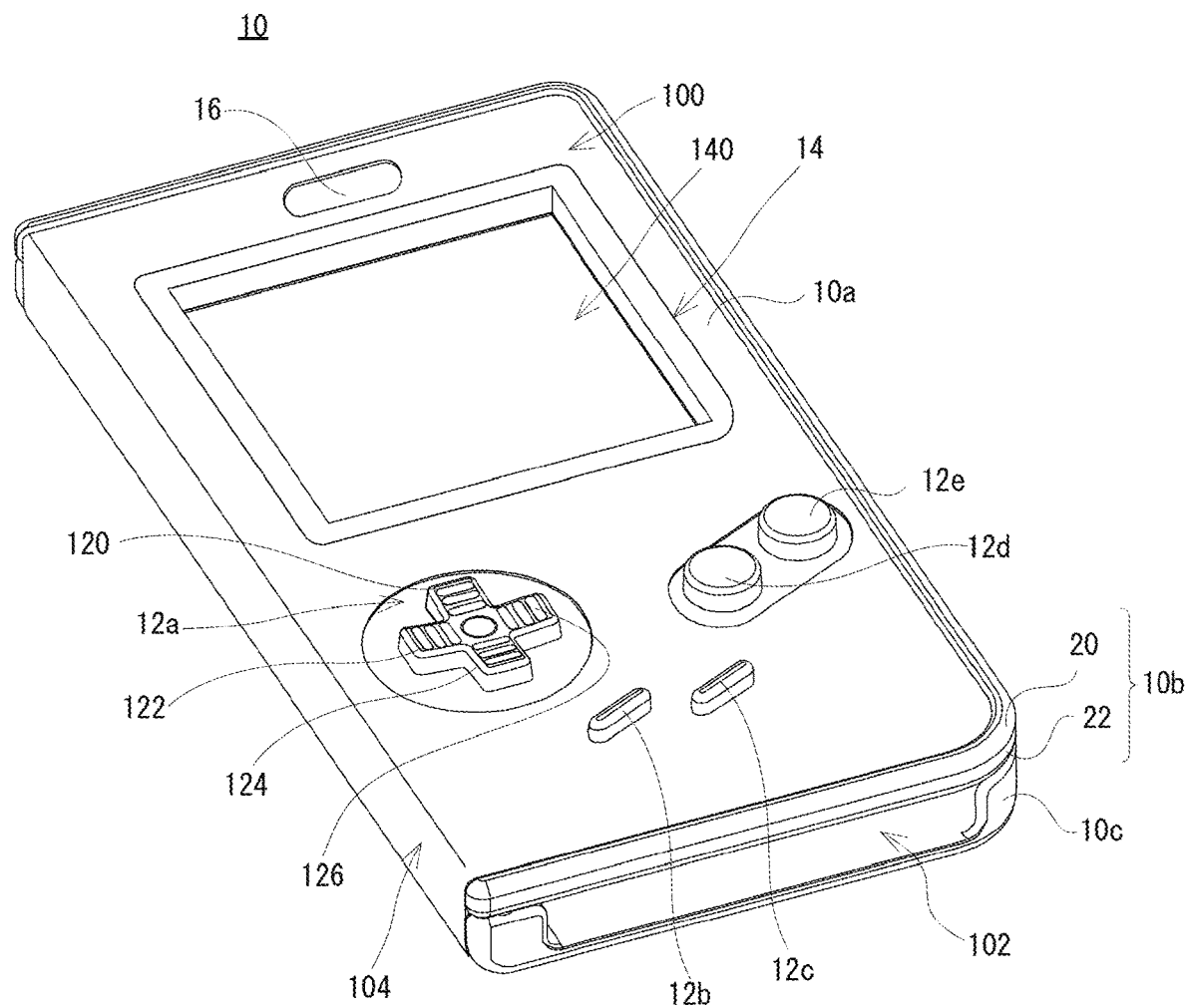
FIG. 1 is a perspective view when viewed from obliquely above, showing a non-limiting example cover of a smartphone in a closed state.

With reference to FIG. 1, a non-limiting example cover 10 is a cover removably attachable to a smartphone 500 (see FIG. 3), and includes an integument 10a, a housing 10b and a holding member 10c. The cover 10 shown in FIG. 1 is in a closed state, and in this state, the housing 10b and the holding member 10c are stuck to an inner side surface of the integument 10a so as to face each other. The integument 10a is natural leather (real leather) or synthetic leather, for example. The housing 10b and the holding member 10c are formed by a resin such as a silicone rubber or a TPU (Thermoplastic Polyurethane), for example.

Figure 2A:
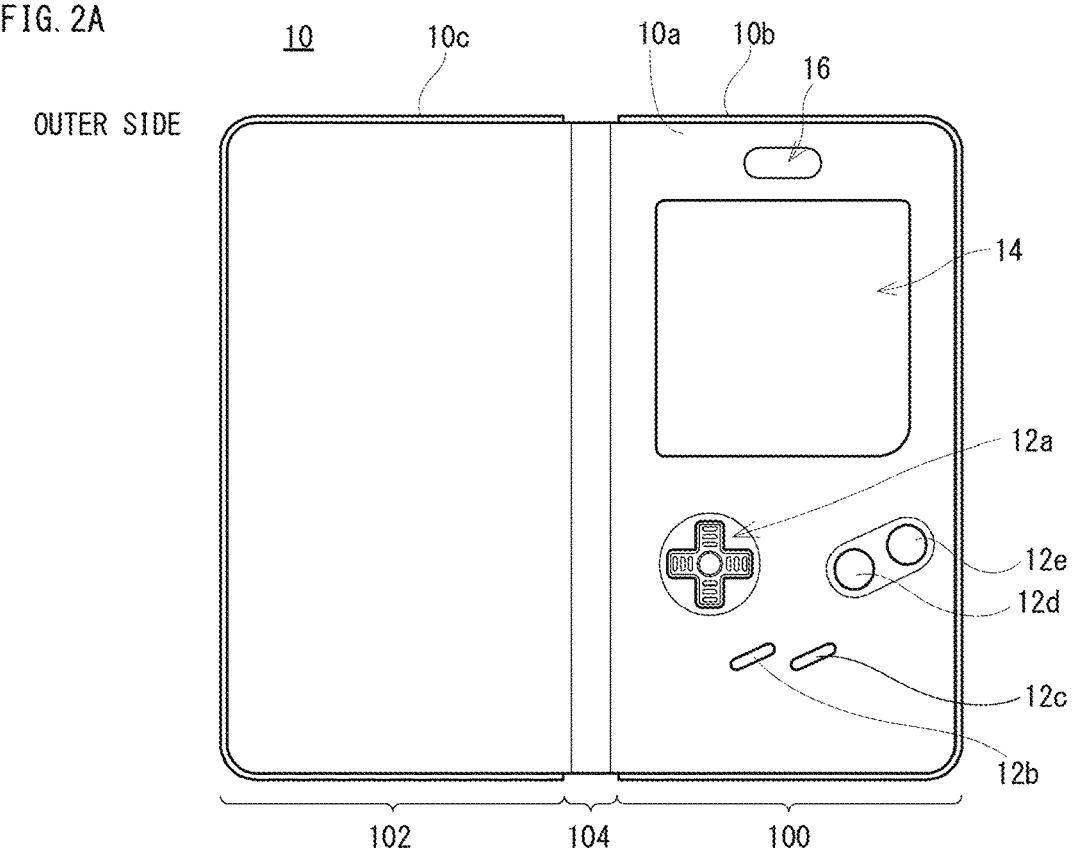
FIG. 2A is an illustration view when viewed from the front, showing a non-limiting example outer side of the cover shown in FIG. 1 in an opened state.
Figure 2B:
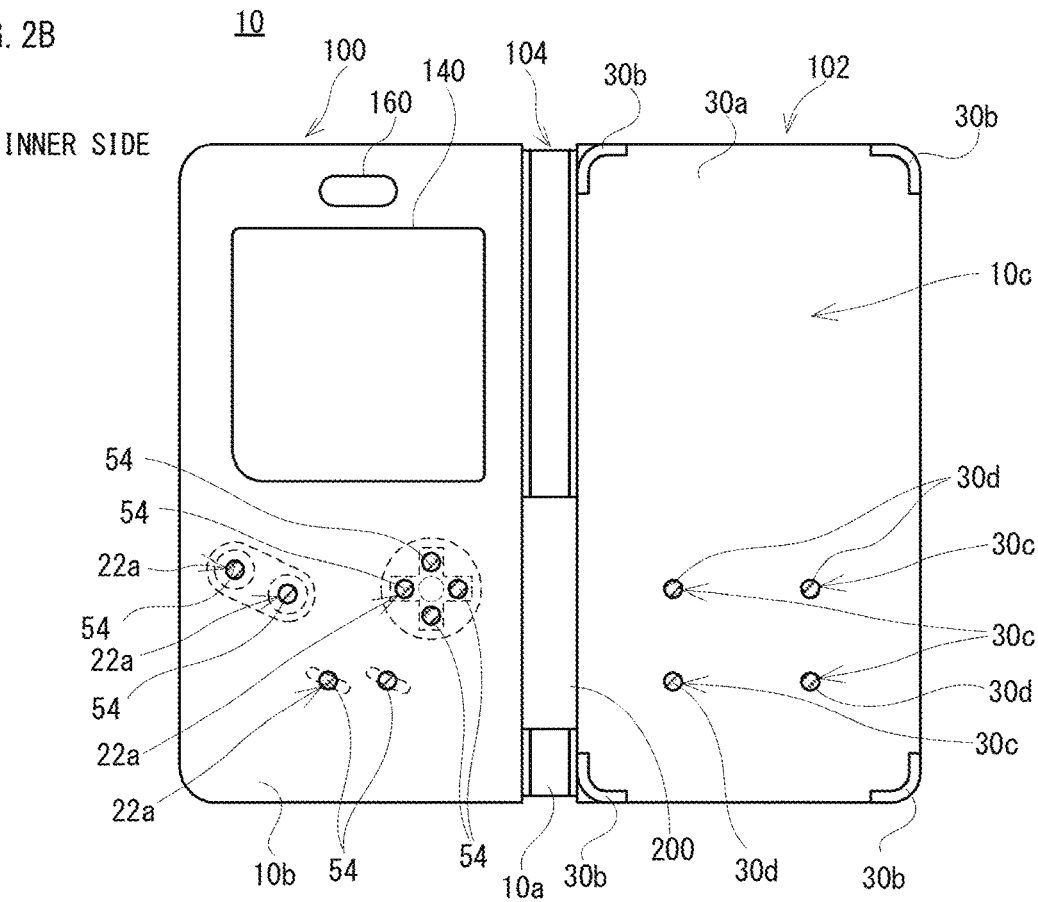
FIG. 2B is an illustration view when viewed from the front, showing a non-limiting example inner side of the cover shown in FIG. 1 in the opened state.

FIG. 2A is an illustration view showing a non-limiting example outer side surface in a state where the cover 10 shown in FIG. 1 is opened, and FIG. 2B is an illustration view showing a non-limiting example inner side surface of the cover 10 in an opened state.

As shown in FIG. 2A and FIG. 2B, the cover 10 can be divided into three portions. Specifically, the cover 10 is divided into a first cover portion 100, a second cover portion 102 and a third cover portion 104.

The first cover portion (front surface side cover portion) 100 includes a part of the integument 10a and the housing 10b, and covers a front side surface among surfaces (outside surfaces) of the smartphone 500 (housing 502).

As shown in FIG. 2A, a plurality of operation buttons 12a, 12b, 12c, 12d and 12e are provided, for example, in an area of approximately lower half on an outside surface of the first cover portion 100. The operation button 12a is a so-called cross button (cross key), and four operation buttons 120, 122, 124 and 126 are formed integrally. Moreover, the operation buttons 12b, 12c, 12d and 12e are push buttons, respectively.

Moreover, the first cover portion 100 is formed, on an outside surface thereof, with an opening portion 14 above the operation buttons 12a-12e. Although the opening portion 14 is not closed in this first embodiment, it may be closed with a member (transmissive member) such as a transparent resin or a transparent glass. For example, the transmissive member is formed in a shape of a sheet. That is, the first cover portion 100 covers at least a part of a touch screen 504 provided on the smartphone 500. Therefore, a user can look at (visibly recognize) the touch screen 504 (display screen) of the smartphone 500 through the opening portion 14.

In addition, although the opening portion 14 is formed in this first embodiment, a cutout may be formed by removing a part of a portion forming the opening portion 14. For example, the cutout may be formed by removing a right side portion of first cover portion 100 forming the opening portion 14. Moreover, for example, the cutout may be formed by removing an upper side portion of first cover portion 100 forming the opening portion 14. Furthermore, for example, the cutout may be formed by removing a right side portion and an upper side portion of first cover portion 100 forming the opening portion 14.

Furthermore, a hole 16 is formed above the opening portion 14. The hole 16 has a track shape or an oblong shape, and is provided corresponding to a position where a receiver speaker 506 and a camera 508 of the smartphone 500 are provided. Therefore, through the hole 16, it is possible to hear a voice that is output from the receiver speaker 506, and to image a face of the user, etc. by the camera 508. However, holes respectively corresponding to the receiver speaker 506 and the camera 508 may be formed individually.

As shown in FIG. 2B, the above-described housing 10b is stuck on an inside surface of the first cover portion 100. This housing 10b holds the operation buttons 12a-12e. The housing 10b has a size corresponding to a size of the smartphone 500, has an opening portion 140 constituting a part of the opening portion 14 and a hole 160 constituting a part of the hole 16, and is formed in a shape of plate having a thickness capable of accommodating structure of a part of each of the operation buttons 12a-12e. Moreover, the housing 10b is constituted by a member 20 (including button covers 24a-24c) and a member 22, in order to accommodate the operation buttons 12a-12e etc. by sandwiching the same (see FIG. 5, FIG. 8 and FIG. 9).

Although details will be described later, the housing 10b is formed with holes 22a corresponding to the operation buttons 12a-12e on a surface (member 22) opposite to a surface provided with the operation buttons 12a-12e, and a conductive member 54 is provided in each of the holes 22a. However, about the operation button 12a, the hole 22a and the conductive member 54 are provided corresponding to each of the operation buttons 120, 122, 124 and 126. Each conductive member 54 is brought into contact (abutted) to the touch screen 504 of the smartphone 500 in a state where the cover 10 attached to the smartphone 500 is closed.

Moreover, as shown in FIG. 2A and FIG. 2B, the second cover portion (back surface side cover portion) 102 is constituted by a part of the integument 10a and the holding member 10c, and covers a back side surface among the surfaces of the smartphone 500, that is, a surface of an opposite side to the front side surface. However, the second cover portion 102 does not need to cover an entire back side surface of the smartphone 500. For example, the second cover portion 102 may be formed with an opening or cutout in a portion that a conductive sheet 200 is not provided. The holding member 10c holds (fixes) the smartphone 500. This holding member 10c is provided with a plate-like member 30a having a size corresponding to a size of the smartphone 500 and members 30b that are provided in corner portions of the member 30a to hold a corner portion of the smartphone 500. Although illustration is omitted, each of the members 30b is formed in a form that engages (hooks on) the corner portion of the smartphone 500 so as to make the smartphone 500 not be detached easily.

Moreover, the member 30a of the holding member 10c is formed with a plurality of (four, in the first embodiment) holes 30c, and the holes 30c are provided with conductive members 30d, respectively. Each of the conductive members 30d is made of a conductive rubber, for example. A conductive rubber is a conductive silicone rubber, and is produced by adding a conductor such as carbon black to a silicone rubber that is an insulator. Therefore, when the cover 10 is attached to the smartphone 500, the back side surface of the smartphone 500 is brought into contact to the member 30a of the holding member 10c and is electrically connected to the conductive sheet 200 described later through the conductive member 30d. In this case, if the housing 502 of the smartphone 500 is formed by a conductive member such as a metal etc., it is possible to consider that the conductive sheet 200 is grounded. Therefore, even if an area of the conductive sheet 200 is made small, it is possible to make a touch panel react.

Furthermore, as shown in FIG. 2A and FIG. 2B, the third cover portion (side surface side cover portion) 104 is constituted by a part of the integument 10a and covers one side surface among the surfaces of the smartphone 500 while coupling the first cover portion 100 and the second cover portion 102 with each other. In this first embodiment, the third cover portion 104 covers a left side surface when viewing the smartphone 500 held (fixed) by the holding member 10c of the second cover portion 102 from the front. Therefore, it is possible to horizontally open the cover 10 like opening a book. In addition, the third case portion 104 has a width substantially equal to a thickness obtained by totaling a thickness of the smartphone 500 (holding member 10c) and a thickness of the housing 10b.

However, the third cover portion 104 may cover a right side surface of the smartphone 500. Moreover, if the third cover portion 104 covers an upper side surface or a lower side surface of the smartphone 500, it is possible to vertically open the cover 10.

Figure 3:
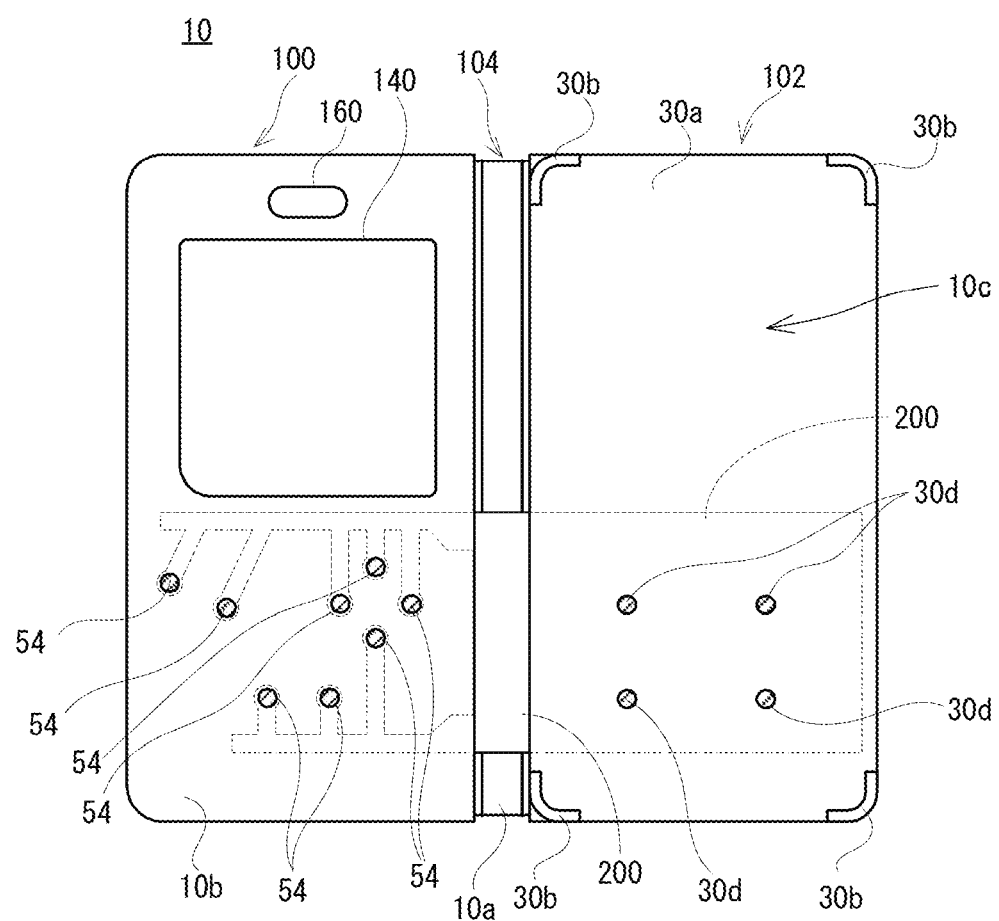
FIG. 3 is an illustration view showing non-limiting example arrangement of a conductive sheet included in the cover.

Moreover, the cover 10 includes a conductor (conductive sheet) 200 as shown in FIG. 2B, and as shown in FIG. 3, the conductive sheet 200 is arranged across the first cover portion 100, the second cover portion 102 and the third cover portion 104, and constitutes a part of each of the first cover portion 100, the second cover portion 102 and the third cover portion 104. A part of the conductive sheet 200 is arranged between the integument 10a and the housing 10b, a further part of the conductive sheet 200 is arranged between the integument 10a and the holding member 10c, and a still further part of the conductive sheet 200 is arranged so as to overlap with the integument 10a in the third cover portion 104. Thus, the conductive sheet 200 is a size not protruding from the cover 10, and is provided inside the cover 10. The term "inside the cover 10" means that it is included in a range totalizing respective ranges (surface areas) of the first cover portion 100, the second cover portion 102 and the third cover portion 104.

In addition, in this first embodiment, the housing 502 of the smartphone 500 and the conductive sheet 200 are made to be brought into contact to each other indirectly by providing the conductive member 30d and arranging the above-described further part of the conductive sheet 200 between the integument 10a and the holding member 10c; however, it does not need to be limited to this. As another example, the above-described further part of the conductive sheet 200 may be brought into contact to the housing 502 of the smartphone 500 directly by arranging the further part of the conductive sheet 200 on a surface (a surface of a side that holds the smartphone 500) opposite to a surface that the holding member 10c is stuck to the integument 10a. In such a case, it is not necessary to form the hole 30c and the conductive member 30d in the member 30a.

Moreover, the conductive sheet 200 may be called a conductive film, which is formed with a metallic fiber or conductive rubber.

Figure 4:
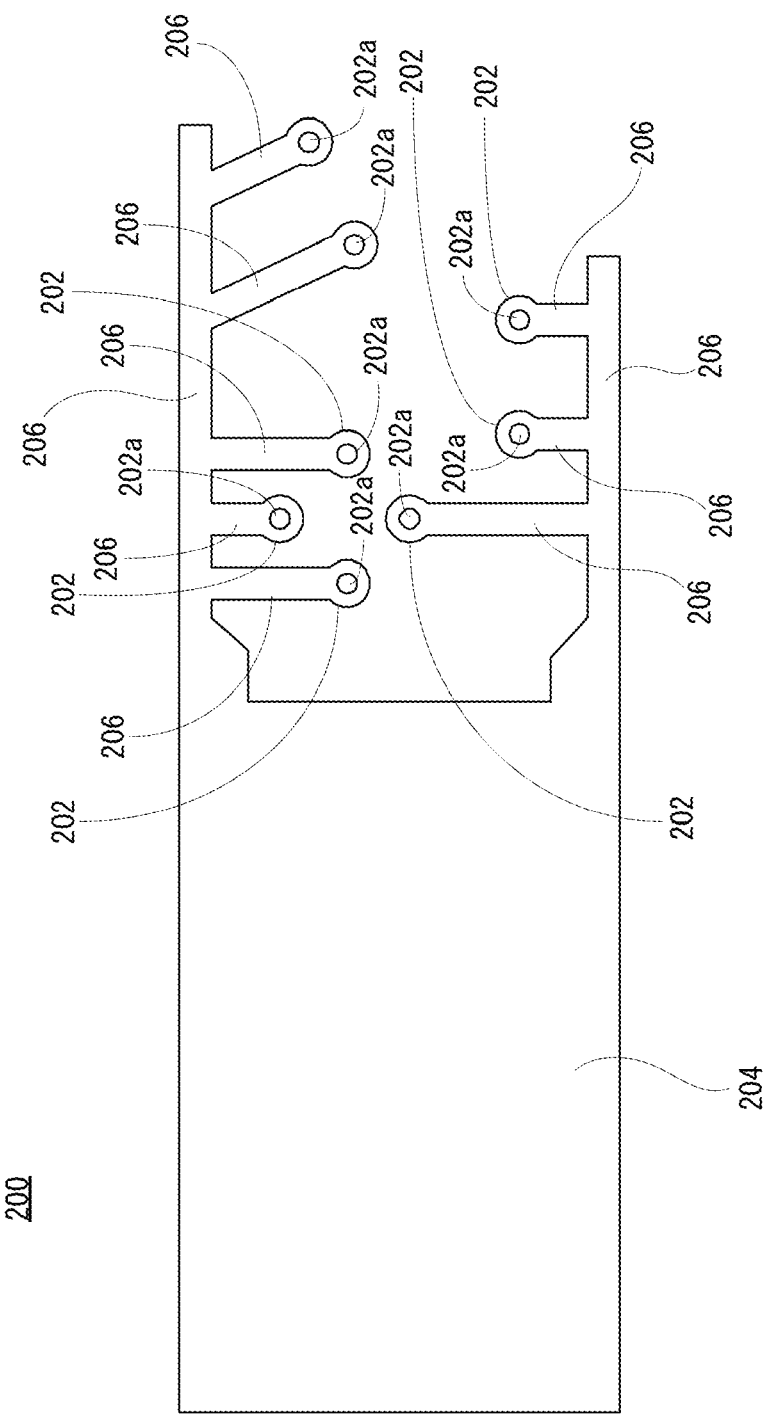
FIG. 4 is an illustration view showing a non-limiting example entire shape of the conductive sheet included in the cover shown in FIG. 1.

As shown in FIG. 4, the conductive sheet 200 is constituted by a plurality of connection portions 202, a body portion 204 and a plurality of coupling portions 206. The connection portions 202 are provided corresponding to respective operation buttons 12a-12e. However, the operation button 12a includes four operation buttons 120, 122, 124 and 126. Therefore, about the operation button 12a, the four connection portions 202 are provided corresponding to this operation button 12a, and the four connection portions 202 are respectively connected to the body portion 204 through the coupling portions 206. Each of the plurality of connection portions 202 is formed in a shape of ring with a hole 202a. As described later, each of the connection portions 202 is arranged between corresponding one of the key tops 50 and the conductive member 54, and the hole 202a is engaged (connected) with the protrusion 50a provided on the key top 50. Therefore, the connection portion 202 is prevented from breaking away from the protrusion 50a of the key top 50. The body portion 204 is a portion for securing a relatively large (sufficient) electrostatic capacitance formed by the body portion 204, and is formed in a quadrangular shape. However, a shape of the body portion 204 is an example, and should not be limited, and it is possible to form it in an arbitrary shape. Each of the plurality of coupling portions 206 is formed in a shape of belt, and couples each of the connection portions 202 to the body portion 204.

In addition, although the protrusion 50a is formed integrally with the key top 50 in this first embodiment, a protrusion 50a that is formed separately from the key top 50 may be connected (joined) to the key top 50.

Figure 5:
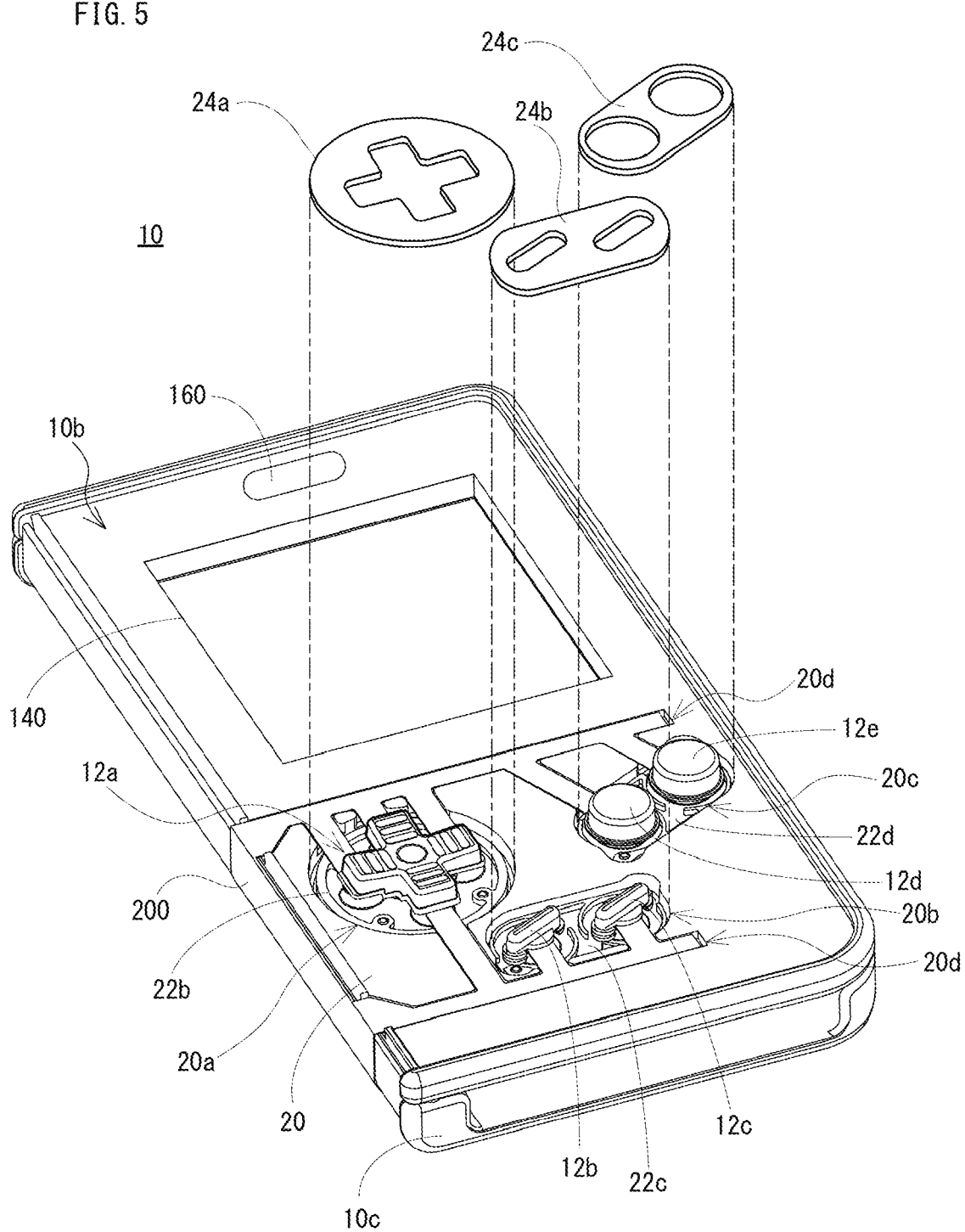
FIG. 5 is a perspective view showing a non-limiting example state where an integument and a pressing member are removed from the cover.

FIG. 5 is an illustration view showing a non-limiting example state where the integument 10a is omitted in the cover 10 shown in FIG. 1, and button covers 24a, 24b and 24c constituting a part of the housing 10b are removed.

As shown in FIG. 5, the member 20 of the housing 10b is formed with holes 20a, 20b and 20c for providing (holding) the operation buttons 12a-12e. Moreover, the member 20 is formed with a groove (recessed portion) 20d for attaching the conductive sheet 200.

The operation button 12a is arranged inside the hole 20a, the operation button 12b and the operation button 12c are arranged inside the hole 20b, and the operation button 12d and the operation button 12e are arranged inside the hole 20c. Although detailed description etc. will be omitted, the member 22 is provided with attachments 22b-22d for attaching operation buttons 12a-12e in positions corresponding to the holes 20a-20c.

A part of the coupling portions 206 of the conductive sheet 200 is accommodated in (fit into) the groove 20d. Moreover, the connection portions 202 and a further part of the coupling portions 206 are arranged inside the holes 20a-20c. Although not visible in FIG. 5, each of the connection portions 202 of the conductive sheet 200 is connected to corresponding one of the operation buttons 12a-12e (see FIG. 8). Moreover, as described using FIG. 3, each of the connection portions 202 is connected to the body portion 204 arranged across the first cover portion 100, the third cover portion 104 and the second cover portion 102, via each of the coupling portions 206.

The button covers 24a, 24b and 24c are members for fixing (holding) the operation buttons 12a-12e (key tops 50) to the housing 10b. The button cover 24a is fixed to the attachment 22b so as to press the operation button 12a. The button cover 24b is fixed to the attachment 22c so as to press the operation button 12b and the operation button 12c. The button cover 24c is fixed to the attachment 22d so as to press the operation button 12d and the operation button 12e. The button covers 24a, 24b and 24c are fixed by screws or adhesive agent, thereby to prevent the operation buttons 12a-12e from breaking away from the housing 10b.

Figure 6:
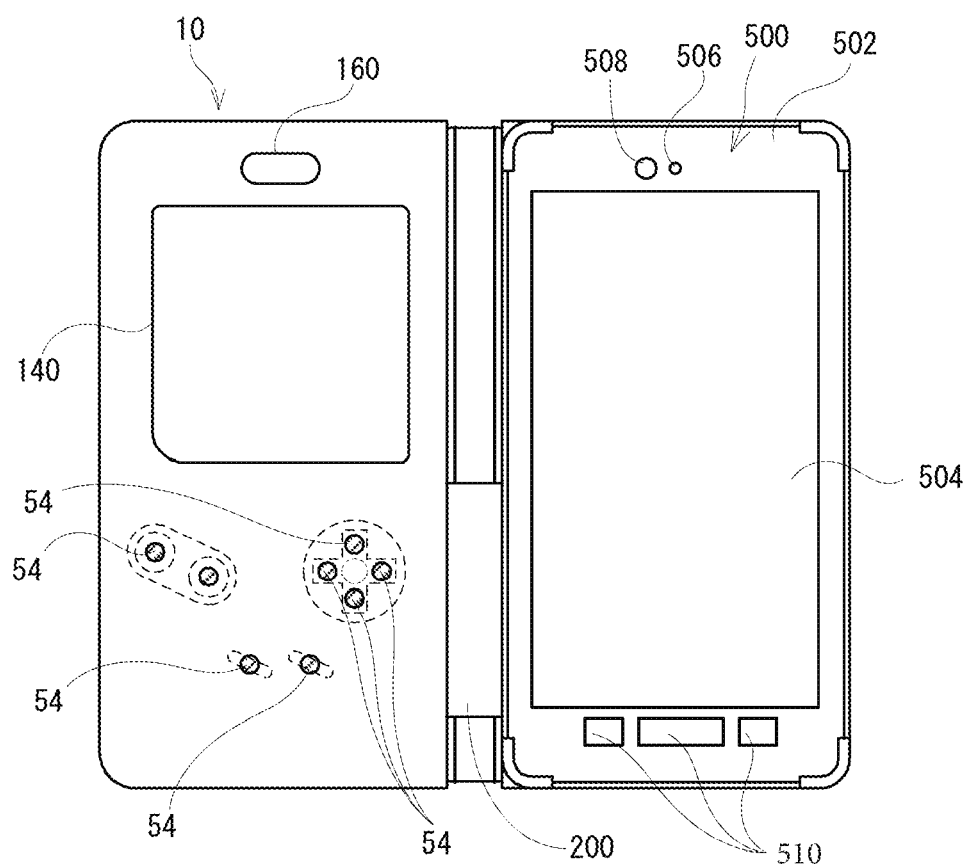
FIG. 6 is an illustration view showing a non-limiting example inner side in a state where the cover attached to the smartphone is opened.

FIG. 6 is an illustration view showing a non-limiting example inner side of the cover 10 that is attached to the smartphone 500, in an opened state. The smartphone 500 shown in FIG. 6 is provided with a touch screen 504 on the front side surface of a housing 502. The touch screen 504 is a touch display equipped with a display and a touch panel integrally, as an example. However, a touch panel may be provided separately from a display. The touch panel is of an electrostatic capacitance system. Moreover, a receiver speaker 506 and a camera 508 are provided above the touch screen 504. Furthermore, hardware operation buttons 510 are provided below the touch screen 504. Although illustration is omitted, a further hardware button(s) are provided on a left or/and right side surfaces of the housing 502, and a bottom side surface of the housing 502 is provided with a connector for connecting a speaker for reproducing a sound or music and a USB cable, etc.

In addition, note that the smartphone 500 shown in FIG. 6 is an example, it should not be limited, and the touch screen 504 may be made large (downwardly long) without providing the operation buttons 510.

Moreover, although the smartphone 500 is described as an example of electronic equipment in the first embodiment, it does not need to be limited to this, and the cover 10 may be attached to other electronic equipment such as a tablet terminal that does not have a telephone function.

Figure 7A:
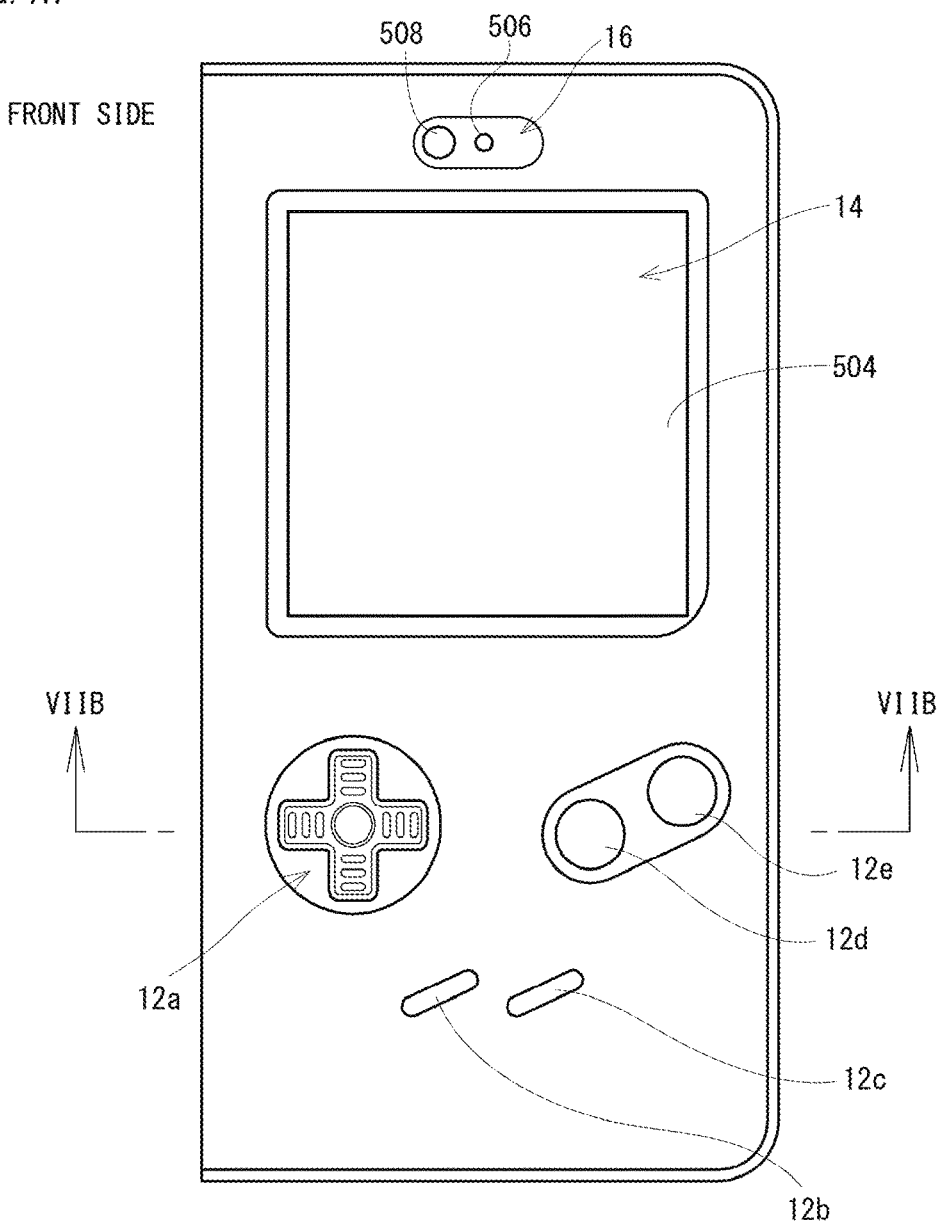
FIG. 7A is an illustration view when viewed from the front, showing a non-limiting example state where the cover attached to the smartphone is closed.
Figure 7B:
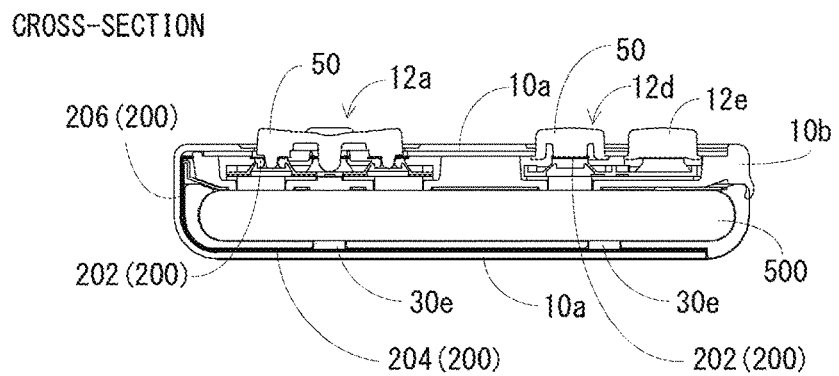
FIG. 7B is a sectional view showing a non-limiting example cross-section at a line VIIB-VIIB in FIG. 7A.
Figure 8:
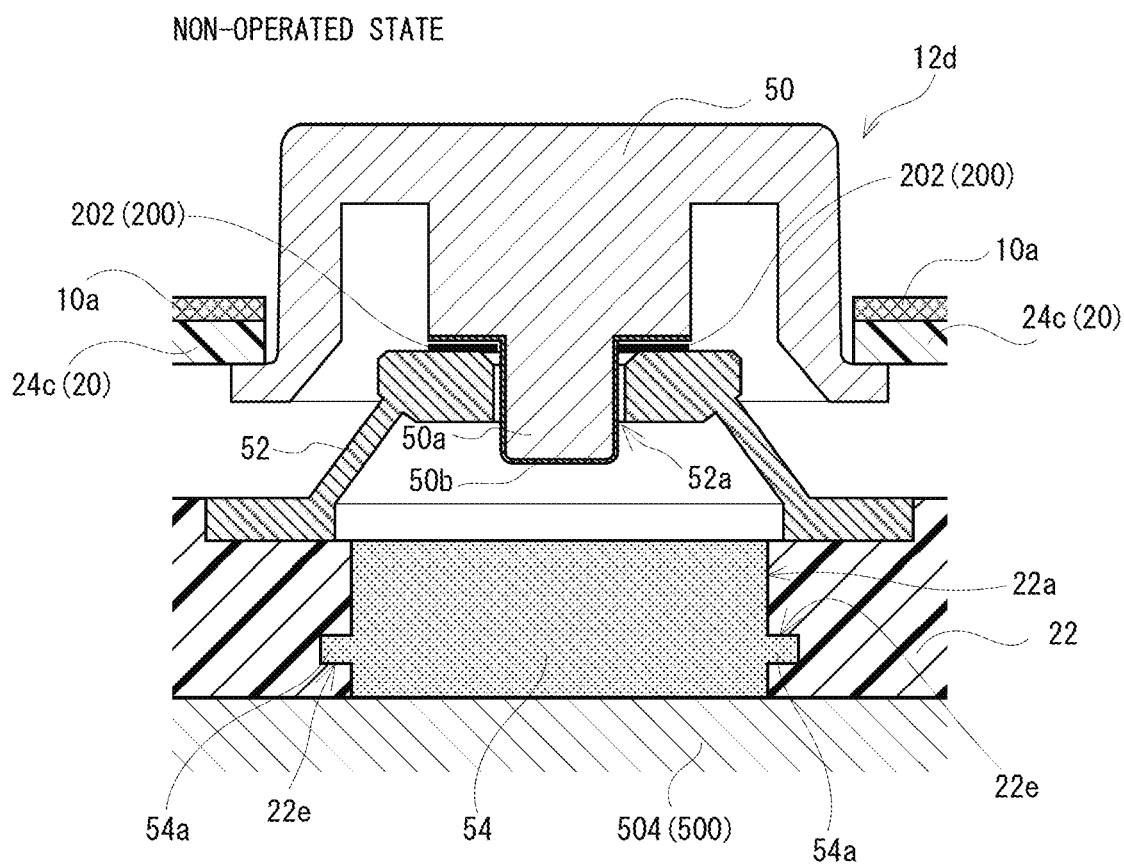
FIG. 8 is an illustration view showing a non-limiting example portion that is provided with an operation button in the sectional view shown in FIG. 7B, being enlarged.

FIG. 7A is an illustration view showing a non-limiting example front surface of the cover 10 that is attached to the smartphone 500, in a closed state. FIG. 7B is a sectional view showing a non-limiting example cross-section at a line VIIB-VIIB in FIG. 7A. In addition, in FIG. 7B, in order to show respective components intelligibly, hatching to be applied to the cross-section is omitted. FIG. 8 is an illustration view showing, with being enlarged, a non-limiting example portion that is provided with the operation button 12d in the sectional view shown in FIG. 7B.

Although it is not clear in FIG. 7A, it is possible to look at the touch screen 504 of the smartphone 500 through the opening portion 14. Moreover, through the hole 16, a voice is emitted from the receiver speaker 506 and imaging with using the camera 508 is possible.

As shown in FIG. 7B and FIG. 8, each of the connection portions 202 of the conductive sheet 200 is connected to the protrusion 50a of corresponding one of the operation buttons (12a-12e), and is extended up to the second cover portion 102 along the integument 10a that constitutes the third cover portion 104. That is, the body portion 204 of the conductive sheet 200 is arranged outside an area where the operation buttons 12a-12e are provided. Moreover, the conductive sheet 200 is provided outside the operation buttons (12a-12e) and inside the cover 10. In this first embodiment, the body portion 204 is arranged in an outside of the first cover portion 100, and is coupled to the connection portions 202 that are connected to the respective operation buttons (12a-12e) by the plurality of coupling portions 206.

Moreover, as shown in FIG. 7B and FIG. 8, each of the operation buttons 12a-12e includes the key top portion (key top) 50, an actuator 52 and a conductive member 54.

The key top 50 is a member having a surface (key top) or portion to which a finger is brought into contact when the user operates it. The operation button 12a is an operation button that four operation buttons 120, 122, 124 and 126 are integrally formed, and the key top 50 is formed in a shape of cross when viewing from the front. In each of the operation button 12b and the operation button 12c, the key top 50 is formed into a track (oblong) shape when viewed from the front. In each of the operation button 12d and the operation button 12e, the key top 50 is formed in a shape of circle when viewed from the front. Each of the key tops 50 of the operation buttons 12a-12e is set to a height that the key top is not pushed inward (back side) from the surface of the integument 10a when being operated (depressed). Moreover, the key top 50 is provided with a protruding portion or protrusion 50a extended toward the actuator 52, and the resin plating 50b, for example is applied to the protrusion 50a and a part of back surface of the key top 50 that is provided with the protrusion 50a. That is, a portion of the key top 50 to be contacted with (connected to) the connection portion 202 of the conductive sheet 200 has conductivity.

The actuator 52 is a non-conductive rubber actuator formed in a shape of dome, and is arranged below the key top 50 in an operating direction of the key top 50. An upper surface (top surface) of the actuator 52 is formed with a hole 52a, and the protrusion 50a formed on the key top 50 is engaged with (inserted into) the hole 52a. Therefore, the actuator 52 is prevented from breaking away. Moreover, since the connection portion 202 is arranged between the key top 50 and the actuator 52 as shown in FIG. 8, it is possible to more reliably prevent the connection portion 202 from breaking away from the protrusion 50a of the key top 50. Moreover, since the conductive sheet 200 (connection portion 202) is formed in a form of sheet or thin film, even if the connection portion 202 is arranged between the key top 50 and the actuator 52, structure of the operation button (12a-12e) or structure of the cover 10 does not become large. That is, it is possible to miniaturize the structure.

However, in the operation button 12a, the protrusion 50a is provided for each key top 50 of the four operation buttons 120, 122, 124 and 126. Moreover, the actuator 52 is arranged in a position corresponding to each key top 50 of the operation buttons 120-126. The actuator 52 is provided for returning (restoring) the key top 50 to a state where it is not operated (home position) in operating the key top 50, that is, after operation of the key top 50. That is, if the user releases a finger after depressing the key top 50, the protrusion 50a of the key top 50 is separated from the conductive member 54 described later. However, a resin spring or a compression spring can be used instead of the rubber actuator, if being non-conductive.

The conductive member 54 is a conductive rubber and is formed in a substantially cylindrical shape. The conductive member 54 is formed with a convex portion 54a projecting in a radial direction on a part of a side surface formed by a curved surface. In a case where the conductive member 54 is arranged in the hole 22a formed in the housing 10b (member 22), the convex portion 54a is fit into (engaged with) an annular groove (concave portion) 22e that is formed on an inner surface of the hole 22a. Therefore, the conductive member 54 is prevented from breaking away. When the key top 50 is operated, the protrusion 50a of the key top 50 is brought into contact to the conductive member 54, whereby the conductive member 54 is electrically connected to the conductive sheet 200. Moreover, in the conductive member 54, a surface opposite to a surface to which the key top 50 (protrusion 50a) is touched comes into contact to the touch panel that is provided on the display portion of the smartphone 500.

However, the conductive member 54 is not necessarily limited to a cylindrical shape, and it may be formed in any arbitrary shape such as a quadrangular prism shape. Moreover, the groove 22e may be formed in another position on the inner surface of the hole 22a as long as it is not in a portion that the member 22 is brought into contact to the smartphone 500. However, the convex portion 54a is formed in a position corresponding to the groove 22e. Moreover, the conductive member 54 may be formed in a truncated cone shape or a truncated square pyramid shape. In such a case, if the housing 10b (member 22) is formed with a hole 22a having an inner surface that is the same shape as an outer peripheral surface of the truncated cone or the truncated square pyramid so that the diameter of the truncated cone or the truncated square pyramid is arranged so as to gradually become smaller toward the back surface of the first cover portion 100, the conductive member 54 attached to the housing 10b can be prevented from breaking away without forming the convex portion 54a and the groove 22e as described above.

Moreover, as shown also in FIG. 8, although the conductive member 54 formed in a shape of cylinder is formed in a size that a top surface or bottom surface thereof does not protrude from the key top 50 in this first embodiment, the conductive member 54 may be formed in a size protruding from the key top 50. That is, at least a part of the conductive member 54 may be arranged between the key top 50 and the smartphone 500 (the touch screen 504).

Moreover, as described above, the connection portion 202 of the conductive sheet 200 is arranged between the key top 50 and the actuator 52. However, the connection portion 202 may be connected to the key top 50 (convex portion or protrusion 50a) in the inside of the actuator 52. In such a case, for example, a notch (hole) that is insertable with the connection portion 202 is formed in a part of a side surface (tapered surface) of the actuator 52, and the connection portion 202 is inserted into the actuator 52 through the notch.

Figure 9:
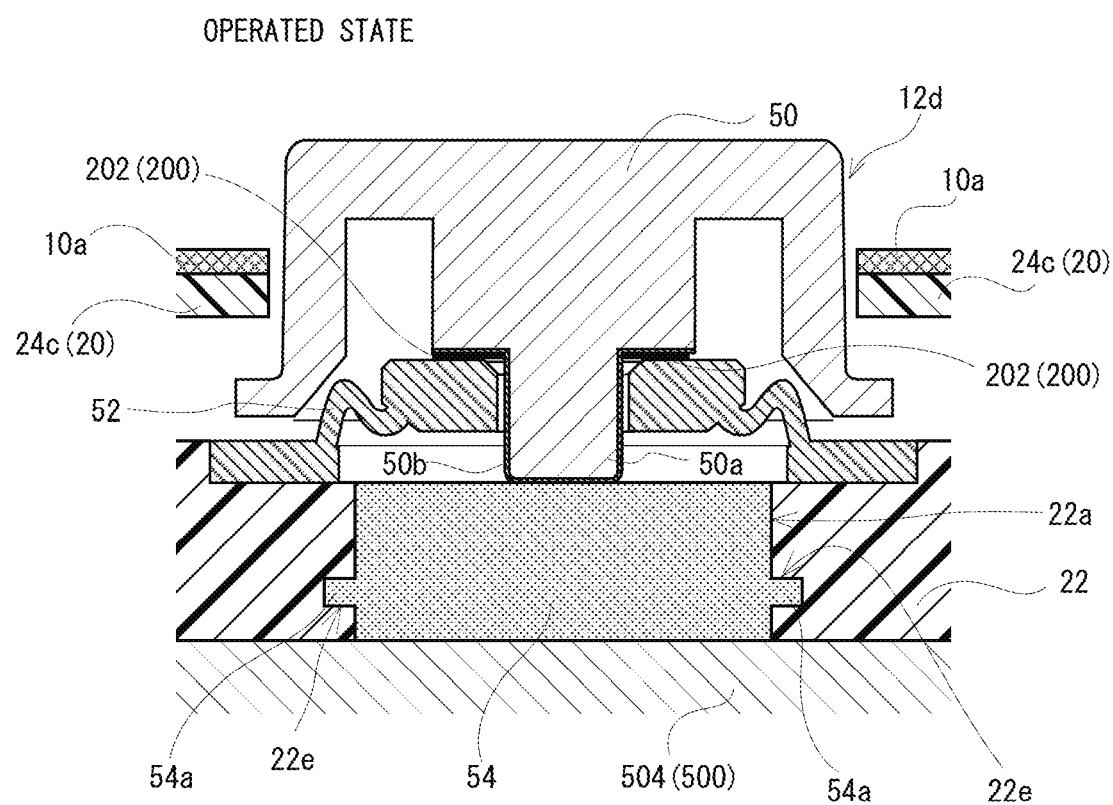
FIG. 9 is an illustration view showing a non-limiting example state where a key top of the operation button shown in FIG. 8 is operated.

Therefore, for example, when the user operates the operation button 12d (12e), the key top 50 is depressed. Then, as shown in FIG. 9, the connection portion 202 of the conductive sheet 200 is pushed down in a state of being sandwiched by the key top 50 and the actuator 52, and the protrusion 50a of the key top 50 is brought into contact to the conductive member 54. Consequently, the conductive sheet 200 is electrically connected to the conductive member 54. At this time, the conductive member 54 is energized in order to make a touch panel react. Therefore, for example, the electrostatic capacitance between the electrodes in the inside of the touch panel changes due to the conductive sheet 200 in a portion that the conductive member 54 is in contact, whereby it is detected that a touch operation is performed in that portion. That is, it is possible to make the touch panel react. In this first embodiment, since any one of the operation buttons 12a-12e provided in the cover 10 is operated, it is detectable that the operation button 12a, 12b, 12c, 12d or 12e that is provided in the portion that the electrostatic capacitance changes is operated. However, in case of the operation button 12a, there is an occasion that not only any one of the operation buttons 120, 122, 124 and 126 is operated but also two buttons that are not arranged in opposite sides are operated (depressed) simultaneously. Even when the two buttons out of the operation buttons 120, 122, 124 and 126 are operated simultaneously, the electrostatic capacitances of the touch panel respectively change in portions that two conductive members 54 provided corresponding to the two key tops 50 being operated simultaneously are in contact.

For example, if a game screen is made to be displayed in a portion of the touch screen 504 corresponding to a portion that the opening portion 14 is formed and a game operation button is set at a position of the touch screen 504 corresponding to the position provided with the operation buttons 12a-12e, it is possible to play a game executed in the smartphone 500 even in a state where the cover 10 is attached to the smartphone 500 and the cover 10 is closed. However, the same is true when an application other than the game is executed.

According to this first embodiment, since the touch panel is caused to react in response to an operation of the key top, it is possible to easily operate the touch panel even in a state of attaching the cover to the smartphone (electronic equipment).

Moreover, according to the first embodiment, the electrostatic capacitance of the conductive sheet can be increased by extending the conductive sheet up to the outside of the portion or area where the operation button(s) is (are) arranged so as to secure a large area, and therefore, it is possible to largely change the electrostatic capacitance between the electrodes of the touch panel in the portion where the conductive member is in contact when the operation button is operated, and accordingly, it is possible to reliably detect that the operation button is operated.

Furthermore, according to this first embodiment, since the touch panel is caused to react by the conductive sheet, the user does not need to operate the operation button with a bare hand. For example, even while wearing a glove that is non-conductive, by operating the operation button, it is possible to make the touch panel react.

Furthermore, according to this first embodiment, since the operation button is provided on the cover, if the same operation button is operated, it is possible to make the same portion of the touch panel react. Therefore, if a predetermined operation input is set to the portion of the touch panel corresponding to the operation button, it is possible to perform a desired operation input reliably.

Second Embodiment

Since a non-limiting example cover 10 of the second embodiment is the same as that of the first embodiment except that electric circuitry and a conductor are used instead of the conductive sheet 200, in the following, different contents will be described.

Figure 10A:
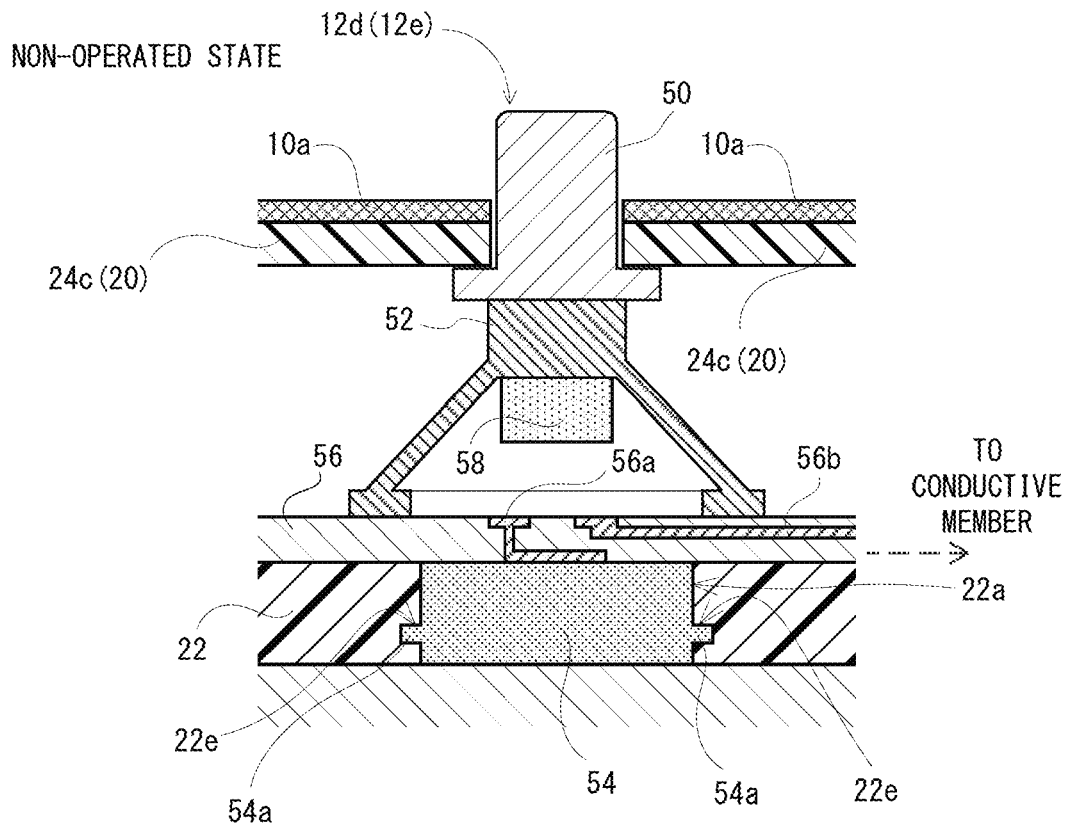
FIG. 10A is a sectional view showing a non-limiting example operation button provided in a non-limiting example cover of a second embodiment.
Figure 10B:
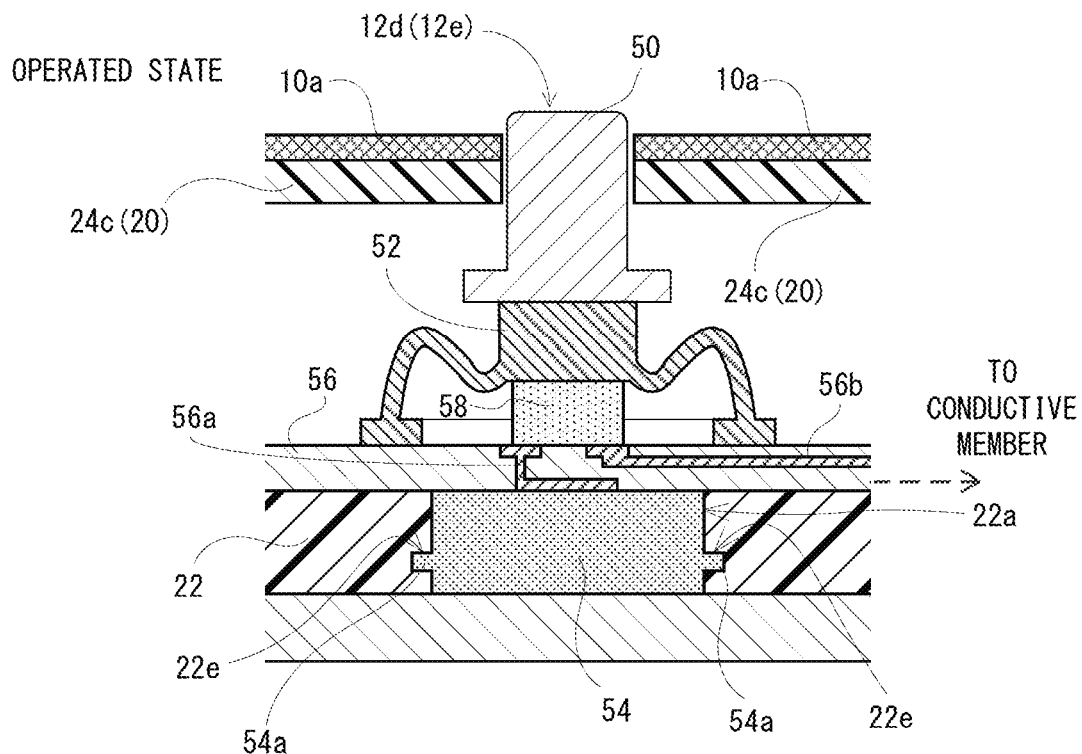
FIG. 10B is an illustration view showing a non-limiting example state where a key top of an operation button shown in FIG. 10A is operated.

FIG. 10A is an illustration view showing a non-limiting example cover 10 of the second embodiment with a cross-section of the operation button 12d or the operation button 12e that is provided in the cover 10. FIG. 10B is an illustration view showing a state where the key top 50 of the operation button 12d or the operation button 12e shown in FIG. 10A is operated (depressed).

In the cover 10 shown in FIG. 10A, an FPC (Flexible printed circuits) 56, for example is provided between the actuator 52 and the conductive member 54 in an inside of the housing 10b. Moreover, a conductive member 58 is provided in an inside of the actuator 52. The conductive member 58 is also a conductive rubber. In the second embodiment, since the conductive member 58 is provided, the protrusion of the key top 50 is omitted. Therefore, the actuator 52 is not formed with a hole.

The FPC 56 has a first electrode 56a that is electrically connected to the conductive member 54 and a second electrode 56b that is electrically connected to a conductive member (not shown) that functions as a body portion. For example, the conductive member that functions as a body portion is a sheet (film) or circuitry formed with the same material (copper) as that of the second electrode 56b. This conductive member is the same also about a case where the operation button 12d (12e) shown in FIG. 11 is provided.

If the key top 50 is depressed as shown in FIG. 10B, the actuator 52 is deformed elastically and the conductive member 58 is brought into contact (abutted) to the FPC 56. Then, the first electrode 56a and the second electrode 56b are electrically connected to each other via the conductive member 58. At this time, the electrostatic capacitance between the electrodes in an inside of the touch panel changes in a portion that the conductive member 54 is in contact, thereby detecting that the touch panel is touched at the portion concerned. That is, it is possible to make the touch panel react.

Figure 11:
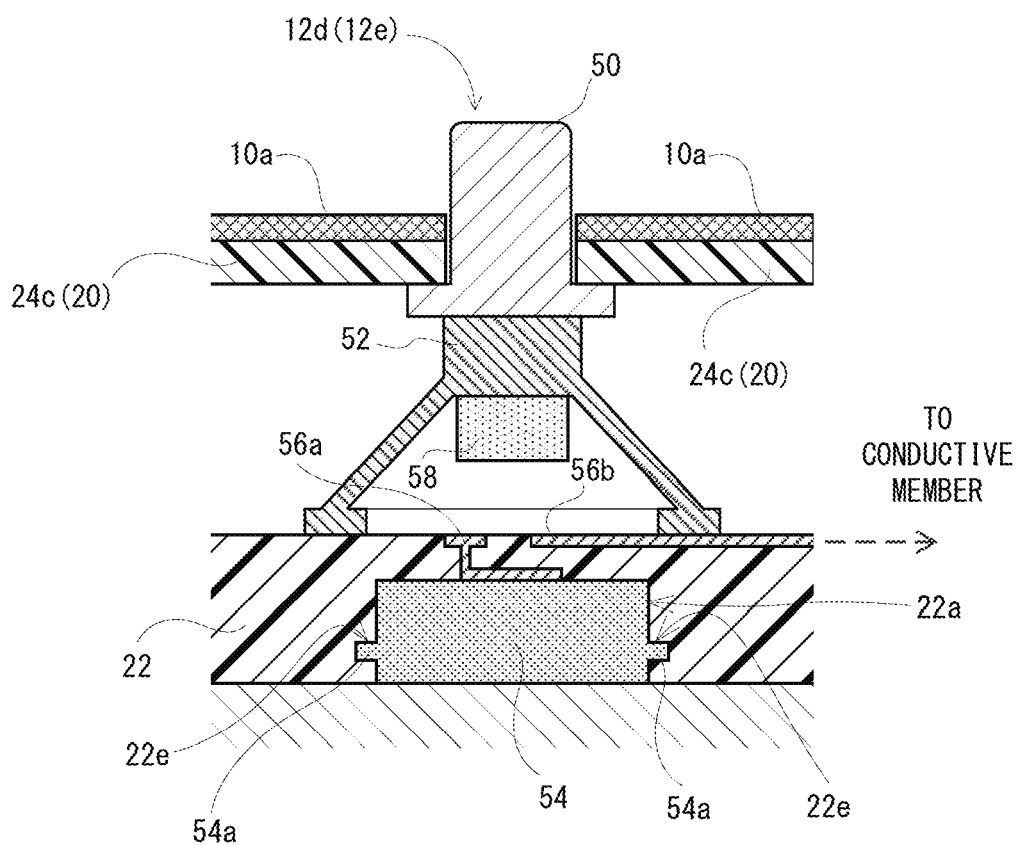
FIG. 11 is a sectional view showing another non-limiting example operation button provided in the cover of the second embodiment.

FIG. 11 is an illustration view showing another non-limiting example cover 10 of the second embodiment with a cross-section of the operation button 12d or the operation button 12e that is provided in the cover 10. In an example shown in this FIG. 11, the first electrode 56a and the second electrode 56b are provided in the housing 10b (member 22). The first electrode 56a may be electrically connected to the conductive member 54 through an inside of the housing 10b (member 22).

Although illustration is omitted, if the key top 50 is depressed, the conductive member 58 is brought into contact (abutted) to the member 22 like a case shown in FIG. 10B. Then, the first electrode 56a and the second electrode 56b are electrically connected to each other through the conductive member 58. At this time, the electrostatic capacitance between the electrodes inside the touch panel changes in a portion that the conductive member 54 is in contact, thereby detecting that the touch panel is touched at the portion concerned. That is, it is possible to make the touch panel react.

According to the second embodiment, like the first embodiment, it is possible to easily operate the touch panel even in a state where the cover is attached to the smartphone (electronic equipment). Moreover, it is reliably detectable that the operation button is operated. Furthermore, the user does not need to operate the operation button by a bare hand. Furthermore, it is possible to perform a desired operation input reliably.

Third Embodiment

Since a non-limiting example cover 10 of the third embodiment is the same as that of the first embodiment except that a key top of the operation button is formed by a material having conductivity instead of the conductive sheet, duplicate description will be omitted.

Figure 12:
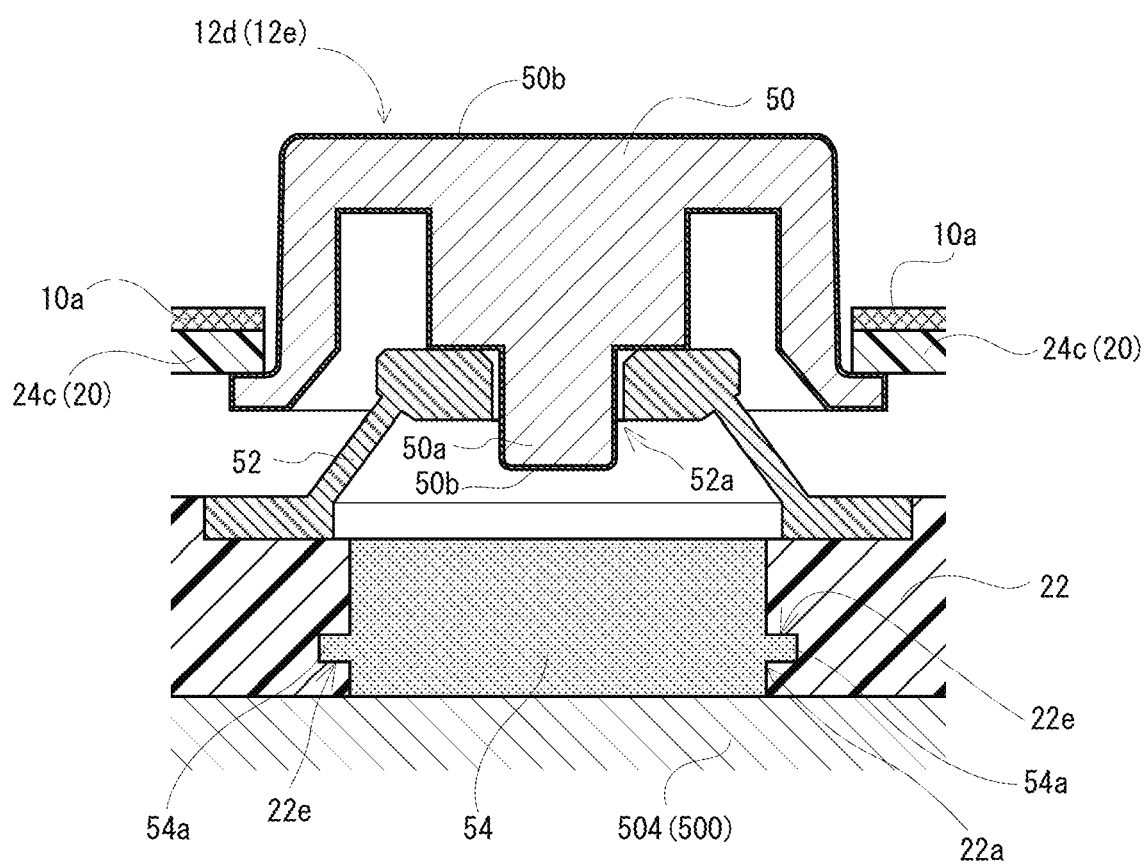
FIG. 12 is a sectional view showing a non-limiting example operation button provided in a non-limiting example cover of a third embodiment.

As shown in FIG. 12, in the cover 10 of the third embodiment, an entire surface of the key top 50 of each of the operation buttons 12a-12e is covered by the resin plating 50b. Therefore, the key top 50 of each of the operation buttons 12a-12e has conductivity.

If any one of the operation buttons 12a-12e is operated (depressed), a portion provided with the protrusion 50a out of the operation buttons 12a-12e is brought into contact to the conductive member 54. At this time, the conductive member 54 is electrically connected to the resin plating 50b of each of the operation buttons 12a-12e. Since an operated one of the operation buttons 12a-12e is touched with a finger of the user, the electrostatic capacitance between the electrodes in an inside of the touch panel changes in a portion that the conductive member 54 is in contact, thereby detecting that the touch panel is touched at the portion concerned. That is, it is possible to make the touch panel react.

In addition, although an entire surface of the key top 50 is covered by the resin plating 50b in the third embodiment, the resin plating 50b may be applied to a part of the surface of the key top 50. For example, the key top 50 includes a first portion to which a finger comes into contact when the user operates it, a second portion that is brought into contact to the conductive member 54 when the user operates it, and a third portion that couples the first portion and the second portion to each other, and the third portion may be applied with the resin plating 50b so as to make the first to third portions have conductivity.

According to the third embodiment, it is also possible to easily operate the touch panel even in a state of attaching the cover to the smartphone (electronic equipment). Moreover, it is reliably detectable that the operation button is operated. Furthermore, it is possible to perform a desired operation input reliably.

In addition, an appearance of specific cover shown in these embodiments, an appearance, arrangement position and the number of pieces of the operation button provided in the cover are examples, and it is possible change them arbitrarily according to an actual product.

Although certain example devices and apparatuses have been described herein, it is to be understood that the appended claims are not to be limited to the devices and apparatuses disclosed, but on the contrary, are intended to cover various modifications and equivalent arrangements included within the spirit and scope of the appended claims.

What is claimed is:

1. A cover that is removably attachable to electronic equipment having a touch screen equipped with a touch panel of an electrostatic capacitance system and a display, comprising:
   a key top that is operable by a user;
   a first conductive portion that is contactable to the touch screen;
   a second conductive portion that is electrically connected to the first conductive portion in response to the operation of the key top so as to make the touch panel react, wherein the second conductive portion is electrically disconnected from the first conductive portion when the key top is not operated; and
   an actuator configured to return the key top to a state where the key top is not operated after the key top is operated, wherein the actuator is non-conductive.

2. The cover according to claim 1, wherein at least a part of the first conductive portion is arranged between the key top and the touch screen.

3. The cover according to claim 1, wherein at least a part of the second conductive portion is provided outside the key top and inside the cover.

4. The cover according to claim 1, wherein the second conductive portion includes at least a connection portion configured to connect to the first conductive portion.

5. The cover according to claim 1, wherein at least a part of the second conductive portion is a thin film.

6. The cover according to claim 1, wherein a part of the second conductive portion is configured to contact to a housing of the electronic equipment.

7. The cover according to claim 1, further comprising a plurality of the first conductive portion.

8. The cover according to claim 7, wherein the second conductive portion is configured to be electrically connected to the plurality of first conductive portions.

9. The cover according to claim 7, wherein the second conductive portion includes a plurality of connection portions, and each of the plurality of connection portions is configured to be electrically connected to corresponding one of the first conductive portions.

10. The cover according to claim 1, wherein the key top is a direction input.

11. The cover according to claim 1, wherein the key top comprises a protruding portion, and the second conductive portion comprises a first hole configured to be engaged with the protruding portion.

12. The cover according to claim 1, wherein the key top comprises a protruding portion, and the actuator comprises a second hole configured to be engaged with the protruding portion.

13. The cover according to claim 1, wherein the cover includes a first cover portion configured to cover at least a part of the touch screen on a surface of the electronic equipment and a second cover portion configured to cover at least a part of a surface of the electronic equipment opposite to the surface provided with the touch screen.

14. The cover according to claim 13, wherein the key top is provided on the first cover portion.

15. The cover according to claim 13, wherein the first cover portion comprises an opening or cutout configured to make at least a part of the touch screen visible through the opening or cutout.

16. The cover according to claim 15, wherein the first cover portion comprises a transmissive portion that covers the opening or cutout.

17. The cover according to claim 1, wherein at least a part of the key top configured to be touched by a user when being operated is non-conductive.

18. The cover according to claim 1, wherein the first conductive portion is configured to contact the touch screen in an operated state and a non-operated state of the key top.

19. The cover according to claim 1, wherein a third conductive portion is attached to the actuator, wherein the first conductive portion and the second conductive portion are electrically connected via the third conductive portion in response to the operation of the key top, wherein the third conductive portion is electrically disconnected from both of the first conductive portion and the second conductive portion while the key top is not operated.

20. A cover that is removably attachable to electronic equipment having a touch screen equipped with a touch panel of an electrostatic capacitance system and a display, comprising:
   a key top that is operable by a user;
   a first conductive portion that is contactable to the touch screen; and
   a second conductive portion that is electrically connected to the first conductive portion in response to the operation of the key top so as to make the touch panel react, wherein a non-conductive actuator is configured to return the key top to a state where the key top is not operated after the key top is operated,
   wherein the second conductive portion is provided outside the key top and inside the cover, and
   wherein the second conductive portion is electrically disconnected from the first conductive portion when the key top is not operated.

21. The cover according to claim 20, wherein at least part of the key top configured to be touched by a user when being operated is non-conductive.

22. A cover that is removably attachable to electronic equipment having a touch screen equipped with a touch panel of an electrostatic capacitance system and a display, comprising:
   a first cover portion that covers at least a part of the touch screen; and
   a second cover portion that covers a surface of the electronic equipment opposite to a surface provided with the touch screen, wherein
   the first cover portion comprises an opening or cutout configured to make at least a part of the touch screen visible through the opening or cutout, and
   the first cover portion comprises a key top that is operable by a user and a conductor configured to contact to the touch panel, wherein the conductor is configured to be electrically connected in order to make the touch panel react in response to an operation of the key top, wherein the conductor is electrically disconnected from the key top when the key top is not operated, and
   the key top includes a first portion that is configured to be touched when being operated by the user, a second portion that is contactable to the conductor, and a third portion that connects the first portion to the second portion, the third portion having conductivity, wherein a non-conductive actuator is configured to return the key top to a state where the key top is not operated after the key top is operated.

23. A cover that is removably attachable to electronic equipment having a touch screen equipped with a touch panel of an electrostatic capacitance system and a display, comprising:
   a key top that is operable by a user;
   a first conductive portion that is contactable to the touch screen;

a second conductive portion that is electrically connected to the first conductive portion in response to the operation of the key top so as to make the touch panel react; and an actuator configured to return the key top to a state where the key top is not operated after the key top is operated, wherein the key top includes a protruding portion, and the second conductive portion comprises a hole configured to be engaged with the protruding portion.

* * * * *